US009885395B2

(12) United States Patent
Hibino

(10) Patent No.: US 9,885,395 B2
(45) Date of Patent: Feb. 6, 2018

(54) SELECTABLE ONE-WAY CLUTCH

(71) Applicant: TOYOTA JIDOSHA KABUSHIKI KAISHA, Toyota-shi, Aichi-ken (JP)

(72) Inventor: Akira Hibino, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 121 days.

(21) Appl. No.: 15/084,050

(22) Filed: Mar. 29, 2016

(65) Prior Publication Data

US 2016/0290416 A1 Oct. 6, 2016

(30) Foreign Application Priority Data

Mar. 31, 2015 (JP) .................................. 2015-073488

(51) Int. Cl.
 *F16D 41/14* (2006.01)
 *F16D 41/12* (2006.01)

(52) U.S. Cl.
 CPC .......... *F16D 41/14* (2013.01); *F16D 41/125* (2013.01)

(58) Field of Classification Search
 None
 See application file for complete search history.

(56) References Cited

U.S. PATENT DOCUMENTS

| 8,256,595 B2 * | 9/2012 | Gokan | .................... | F16D 13/56 |
| | | | | 192/54.5 |
| 8,448,770 B2 * | 5/2013 | Gokan | .................... | F16D 13/56 |
| | | | | 192/54.5 |
| 8,967,350 B2 * | 3/2015 | Fujii | ..................... | F16D 27/115 |
| | | | | 192/35 |

FOREIGN PATENT DOCUMENTS

| JP | 2008-267866 A | 11/2008 |
| JP | 5120650 B2 | 1/2013 |
| JP | 2013-086585 A | 5/2013 |

\* cited by examiner

*Primary Examiner* — Colby M Hansen
(74) *Attorney, Agent, or Firm* — Andrews Kurth Kenyon LLP

(57) ABSTRACT

A selectable one-way clutch adapted to prevent an undesirable engagement is provided. The selectable one-way clutch comprises first spline teeth formed on a connecting portion of a notch plate connected to a rotary member; second spline teeth formed on the rotary member to be meshed with the first spline teeth; a first flank formed individually on the first spline teeth; and a second flank formed individually on the second spline teeth to be brought into contact to the first flank. The first flank and the second flank are individually set at a predetermined angle to establish a component of torque of the rotary member rotating the notch plate to isolate the notch plate away from the selector plate.

3 Claims, 4 Drawing Sheets

SELECTABLE ONE-WAY CLUTCH

CROSS REFERENCE TO RELATED APPLICATIONS

The present invention claims the benefit of Japanese Patent Application No. 2015-073488 filed on Mar. 31, 2015 with the Japanese Patent Office, the disclosure of which is incorporated herein by reference in its entirety.

BACKGROUND

1. Field of the Invention

Preferred example relates to the art of a selectable one-way clutch adapted to selectively enable torque transmission only in one direction and to interrupt torque transmission in both directions.

2. Discussion of the Related Art

Japanese Patent Publication No. 5120650 describes a hybrid drive unit having one-way clutches. According to the teachings of Japanese Patent Publication No. 5120650, power of an engine is distributed to a first motor-generator and to an output member through a planetary gear unit serving as a power distribution device. The first motor-generator is operated as a generator in such a manner to establish a reaction force to control a speed of the engine, and a second motor-generator is operated as a motor by an electric power generated by the first motor-generator to generate a driving torque. The one-way clutches are disposed between the first motor-generator and a stationery member such as a casing, between the first motor-generator and a carrier of the planetary gear unit, and between the carrier and the stationary member. Those one-way clutches are arranged in tandem with dog clutches. In the hybrid drive unit taught by Japanese Patent Publication No. 5120650, therefore, rotation of a sun gear or the carrier of the planetary gear unit connected to the first motor-generator can be halted in a predetermined direction so that the sun gear and the carrier can be rotated integrally to diversify a driving condition.

A conventional selectable one-way clutch is adapted to selectively enable torque transmission only in one direction. To this end, in the selectable one-way clutch, a selector plate interposed between a pocket plate and a notch plate is rotated by an electromagnetic actuator or the like to selectively provide an engagement between the selector plate and the pocket plate. The selectable one-way clutch of this kind may also be used in the hybrid vehicle taught by Japanese Patent No. 5120650 instead of the one-way clutch.

In order to reduce friction, lubrication oil is applied to the selectable one-way clutch to form oil films in friction sites between the pocket plate and the selector plate, and between the selector plate and the notch plate. However, if viscosity of the oil is too high, the selector plate may be rotated undesirably by a drag torque or a shearing force resulting from a rotation of the notch plate if the pocket plate is halted. For this reason, the pocket plate may be brought into engagement accidentally with the notch plate if temperature is extremely low.

SUMMARY

Aspects of a preferred embodiment has been conceived noting the foregoing technical problems, and it is therefore an object of the preferred embodiment is to provide a selectable one-way clutch that can prevent the selector plate from being rotated undesirably by a rotation of the notch plate through the lubrication oil.

Preferred embodiment relates to a selectable one-way clutch, comprising: a pocket plate that is fixed to a predetermined stationary member; a notch plate that is connected to a rotary member while being allowed to rotate relatively with the pocket plate opposed thereto; and a selector plate that is interposed between the pocket plate and the notch plate while being allowed to rotate relatively with the pocket plate and the notch plate. An operating mode of the selectable one-way clutch is selectively shifted by rotating the pocket plate within a predetermined angle between an overrunning mode in which the notch plate is allowed to rotate relatively with the pocket plate in both directions without transmitting torque, and an engagement mode in which the notch plate is brought into engagement with the pocket plate to enable torque transmission in one direction. In order to achieve the above-explained objective, according to the preferred embodiment, the selectable one-way clutch is provided with: first spline teeth formed on a connecting portion of the notch plate connected to the rotary member; second spline teeth formed on the rotary member to be meshed with the first spline teeth to enable torque transmission between the notch plate and the rotary member; a first flank formed individually on the first spline teeth; and a second flank formed individually on the second spline teeth to be brought into contact to the first flank. In addition, the first flank and the second flank are individually set at a predetermined angle with respect to a plane extending along a common rotational center axis of the notch plate and the rotary member to establish a component of torque of the rotary member rotating the notch plate in a same direction as a rotational direction of the selector plate to bring the selectable one-way clutch into the engagement mode, so as to isolate the notch plate away from the selector plate.

In a non-limiting embodiment, the selectable one-way clutch is further provided with: a first cylinder formed in the notch plate in which the first spline teeth are formed on an inner circumferential face; and a second cylinder formed on the rotary member in which the second spline teeth are formed on an outer circumferential face to be meshed with the first spline teeth.

In a non-limiting embodiment, the first spline teeth may be formed on a face of the notch plate opposed to the rotary member in the axial direction, and the second spline teeth may be formed on a face of the rotary member opposed to the notch plate in the axial direction.

According to the preferred embodiment, the first spline teeth are brought into contact to the second spline teeth by applying a torque of the rotary member to the notch plate in a direction to rotate the selector plate to an engagement position. Since the first spline teeth and the second spline teeth are thus skewed at a predetermined angle, a thrust force as a component of the torque is generated in a direction to push the notch plate away from the selector plate. According to the preferred embodiment, therefore, the notch plate can be prevented from being rotated to be brought into engagement undesirably with the pocket plate by a drag torque even if the notch plate is rotated in the forward direction under a condition that the viscosity of the lubrication oil is high.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION OF THE ILLUSTRATIVE EMBODIMENT(S)

Figure 1:
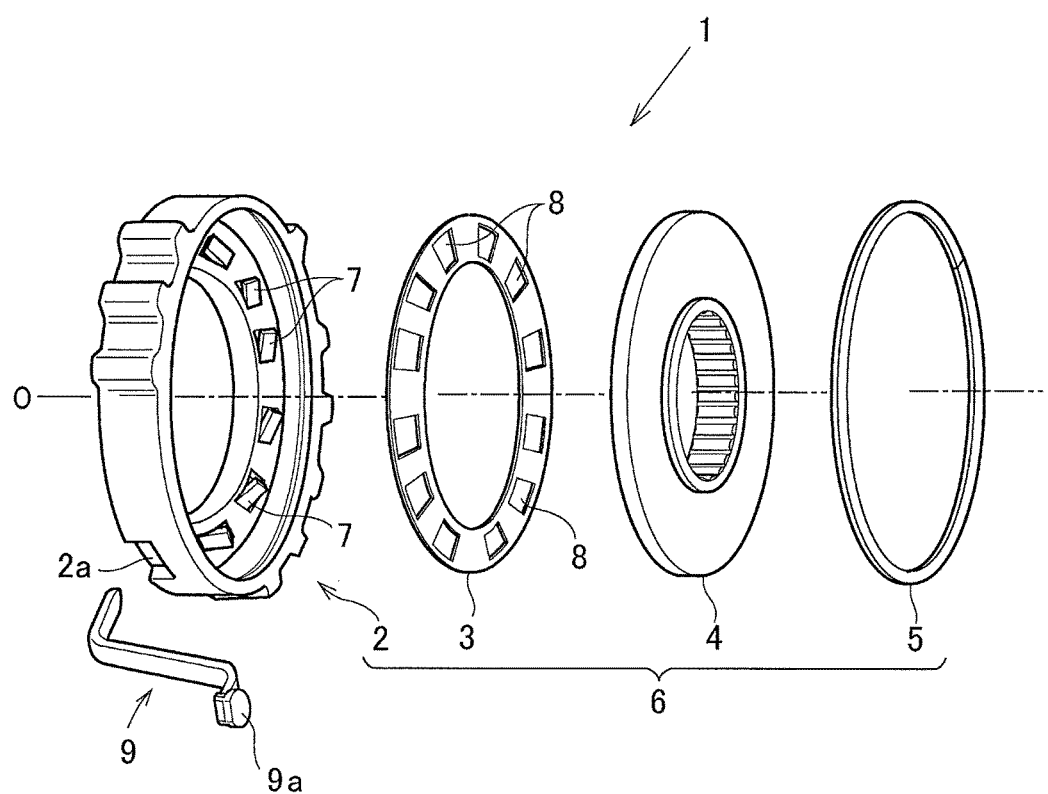
FIG. 1 is an exploded view of the selectable one-way clutch according to the preferred embodiment.

Referring now to FIG. 1, there are shown each part of a body assembly 6 of a selectable one-way clutch (to be abbreviated as the "SOWC" hereinafter) 1 in detail. As shown in FIG. 1, the body assembly 6 of the SOWC 1 comprises a pocket plate 2, a selector plate 3, and a notch plate 4. The pocket plate 2 comprises an outer cylinder and an annular plate formed along an inner circumference of the cylinder. The selector plate 3 and the notch plate 4 are held in the cylinder in the order shown in FIG. 1, and a snap ring 5 is fitted into a clearance between an outer circumference of the notch plate 4 and an inner circumference of the cylinder of the pocket plate 2 to close the pocket plate 2.

As illustrated in FIG. 1, a plurality of pockets (or depressions) are formed in a circular manner on a face of the annular plate of the pocket plate 2 being opposed to the notch plate 4, and a rectangular strut 7 is individually held in each pocket in a pivotal manner around one end thereof as a fulcrum. In order to push up the other end of the strut 7 toward the notch plate 4, a spring (not shown) is interposed between one end of the strut 7 and a bottom of the pocket.

The selector plate 3 is an annular member having similar dimensions as the annular plate of the pocket plate 2, and apertures 8 are formed on the selector plate 3 in a circular manner and in a same number as the pockets. When the selector plate 3 is rotated in the pocket plate 2 to an engagement position at which the apertures 8 are individually overlapped with each of the pockets, said other end (to be called the "leading end" hereinafter) of each strut 7 is allowed to be pushed up by the spring 9 to be brought into engagement with a notch (not shown) of the notch plate 4. By contrast, when the selector plate 3 is rotated to a disengagement position at which the apertures 8 are individually displaced from each of the pockets, each strut 7 is pushed into the pocket by the selector plate 3.

The notch plate 4 is also an annular member, and the notches are formed on a face of the notch plate 4 facing to the pocket plate 2 in a circular manner and in the same number as the pockets of the pocket plate 2. When the leading end of the strut 7 is pushed into the notch of the notch plate 4 through the aperture 8 of the selector plate 3, the leading end of the strut 7 is brought into abutment to an engagement wall of the notch.

The selector plate 3 and an actuator (not shown) are connected through an arm 9. One of the end portions of the arm 9 is inserted into a through hole 2a of the pocket plate 2 from outside to be connected to the selector plate 3 in such a manner to be rotated integrally therewith. An intermediate portion of the arm 9 is bent to extend parallel to the cylinder of the pocket plate 2, and the other end of the arm 9 is bent radially outwardly at a point further than the cylinder of the pocket plate 2. In addition, a semi-circular head 9a is attached to the other leading end of the arm 9, and the head 9a is connected to a plunger of the actuator.

The SOWC 1 is shifted selectively between an engagement mode and an overrunning mode by rotating the selector plate 3 within a predetermined angle. Specifically, in the engagement mode, the notch plate 4 is brought into engagement with the pocket plate 2 to enable torque transmission in one direction. By contrast, in the overrunning mode, the notch plate 4 is allowed to rotate relatively with the pocket plate 2 in both directions without transmitting torque. In order to limit damage on those plates, lubrication oil is applied to a contact site between those plates.

Figure 2:
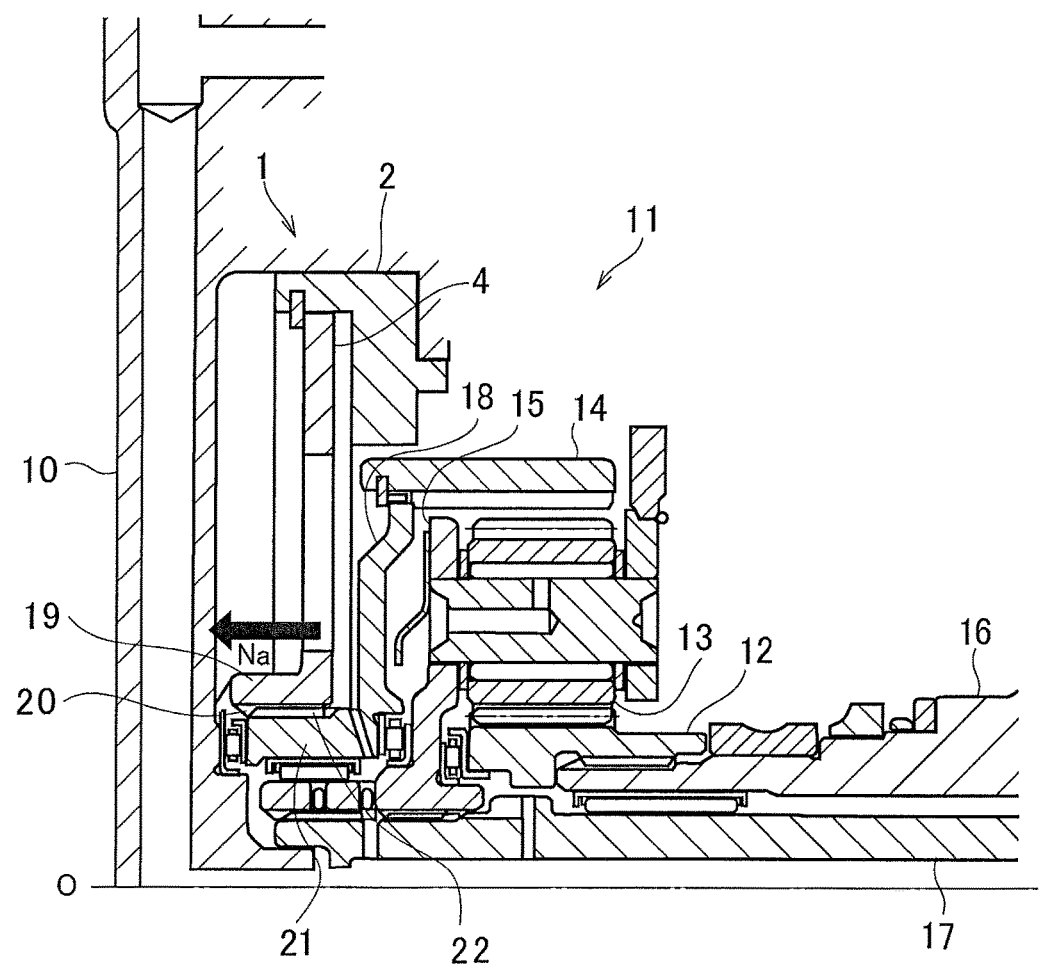
FIG. 2 is a cross-sectional view of the transmission in which the selectable one-way clutch is arranged.

Turning to FIG. 2, there is shown a cross-section of the SOWC 1 arranged in a transmission. As depicted in FIG. 2, the pocket plate 2 is fixed to a casing (or an end cover) 10 as a stationary member.

The SOWC 1 is connected to a double-pinion planetary gear unit 11 comprising a sun gear 12, a ring gear 14 arranged around the sun gear 12, first pinion gears 13 meshing individually with the sun gear 12, second pinion gears interposed between the first pinion gear 13 and the ring gear 14, and a carrier 15 supporting the first pinion gears 13 and the second pinion gears in a rotatable and resolvable manner. The sun gear 12 is connected to a rotary shaft 16, the carrier 15 in connected to an input shaft 17, and the ring gear 14 is connected to the notch plate 4 through a flange 18. The rotary shaft 16 is also connected to a motor-generator (not shown), and the input shaft 17 is also connected an engine (not shown).

According to the preferred embodiment, the SOWC 1 is adapted to isolate the notch plate 4 from the selector plate 3 along a rotational center axis O by applying a torque of the ring gear 14 to the notch plate 4 in a same direction as a rotational direction of the selector plate 3 from an overrunning position to an engagement position. In the following explanation, a rotational direction to bring the SOWC 1 into the engagement mode will be called the forward direction.

An outer cylinder 19 is formed around a rotational center axis of the notch plate 4, and first spline teeth 20 are formed on an inner circumferential face of the outer cylinder 19. On the other hand, an inner cylinder 21 is formed on an inner circumferential end of the flange 18, and second spline teeth 22 are formed on an outer circumferential face of the inner cylinder 21. That is, the outer cylinder 19 is fitted onto the inner cylinder 21 while meshing the first spline teeth 20 with the second spline teeth 22 to provide a connection between the ring gear 14 as a rotary member and the notch plate 4.

Figure 3:
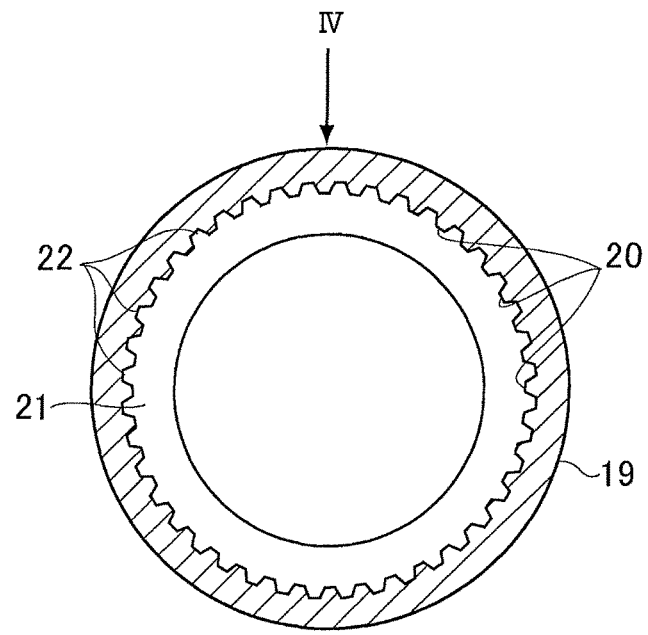
FIG. 3 is a cross-sectional view showing cross-sections of the cylinder members engaged with each other.
Figure 4:
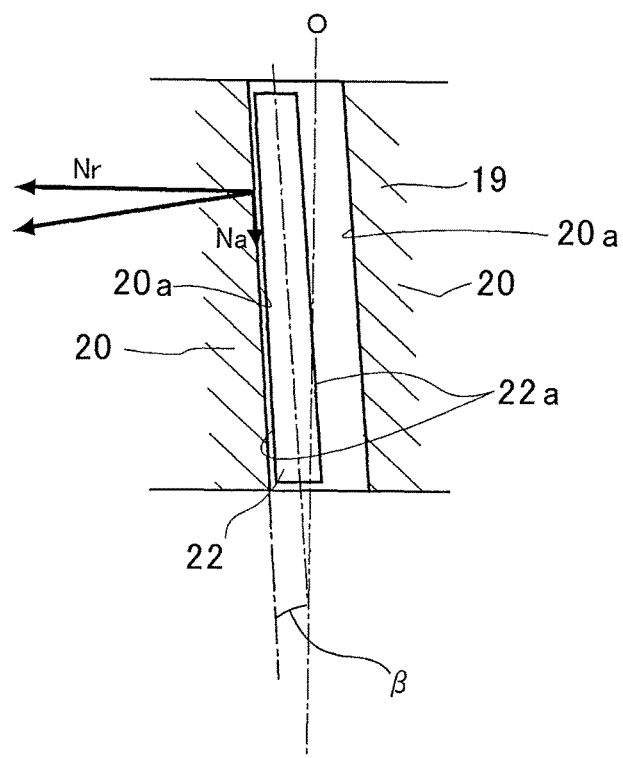
FIG. 4 is a top view showing splines engaged to each other viewed from the direction indicated by the arrow IV in FIG. 3.

FIG. 3 shows a cross-section of the outer cylinder 19 thus fitted onto the inner cylinder 21, and FIG. 4 shows an engagement state of the first spline teeth 20 with the second spline tooth 22 viewed from the direction indicated by the arrow IV in FIG. 3. As illustrated in FIG. 4, one of the second spline teeth 22 of the ring gear 14 side is fitted into a spline groove formed between the first spline teeth 20 of the notch plate 4 side in such a manner that one of second flanks 22a of the second spline teeth 22 is brought into contact to one of first flanks 20a of the first spline teeth 20.

According to the preferred embodiment, the first spline teeth 20 and the second spline teeth 22 are individually set at a predetermined angle $\beta$ (i.e., skewed) with respect to a plane extending along the rotational center axis O. Specifically, each of the first flank 20a of the first spline teeth 20 and each of the second flanks 22a of the second spline teeth 22 are individually set at a predetermined angle $\beta$ in such a manner as to establish a component of the torque of the ring gear 14 rotating the notch plate 4 in a same direction as a rotational direction of the selector plate 3 to bring the SOWC 1 into engagement mode, so as to isolate the notch plate 4 away from the selector plate 3.

A tangential force Nr as a component of the torque can be expressed as:

$$Nr=2T/R; \text{ and}$$

a thrust force Na as a component of the torque pushing the notch plate 4 away from the selector plate 3 can be expressed as:

$$Na=Nr \cdot \tan \beta;$$

where "T" is an input torque (Nm) as a drag torque generated by rotating the notch plate 4 in the lubrication oil, and "R" is a pitch radius (m) of the spline. The input torque T can be expressed as:

$$T=\pi\mu\omega r^4/h;$$

where "μ" is viscosity of the oil (Pa·s), "ω" is an angular velocity (rad/s), "r" is a radius (m) of the notch plate 4, and "h" is a clearance (m) between the notch plate 4 and the selector plate 3.

Thus, the first spline teeth 20 and the second spline teeth 22 are individually set at a predetermined angle β so that the notch plate 4 is pushed away from the selector plate 3 by the thrust force Na when the notch plate 4 is rotated in the forward direction by a rotation of the ring gear 14.

According to the preferred embodiment, therefore, the notch plate 4 can be prevented from being rotated to be brought into engagement undesirably with the pocket plate 2 by the drag torque even if the notch plate 4 is rotated in the forward direction under a condition that the viscosity of the lubrication oil is high.

Figure 5:
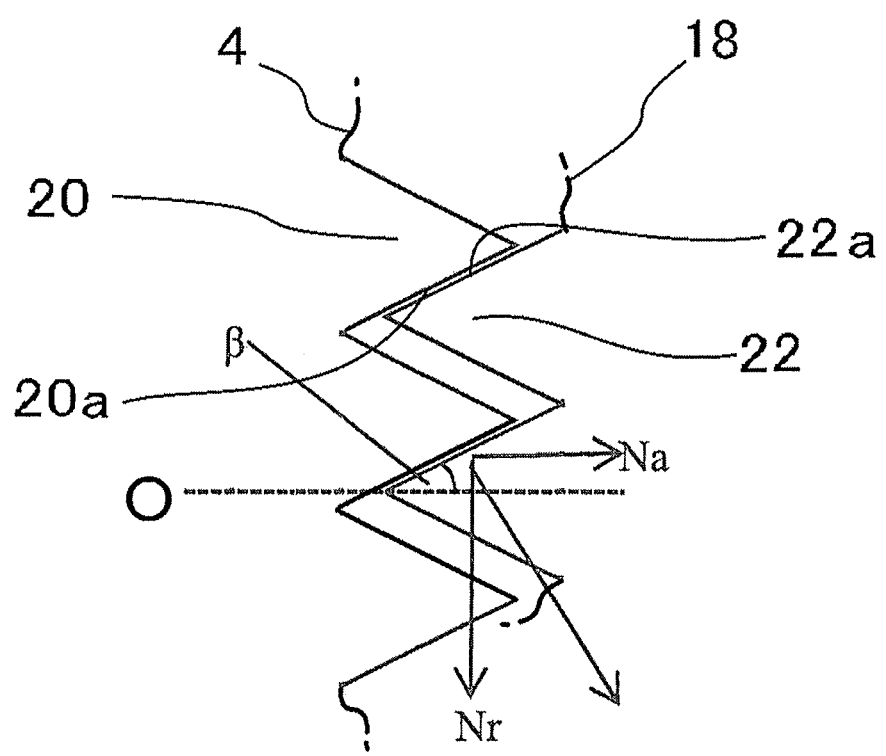
FIG. 5 is an enlarged view showing an engaged portion of the face spline according to another example.

Although the above exemplary embodiment of the present application have been described, it will be understood by those skilled in the art that the present application should not be limited to the described exemplary embodiment, and various changes and modifications can be made within the spirit and scope of the present application. For example, as illustrated in FIG. 5, the first spline teeth 20 and the second spline teeth 22 may also be formed individually into face spline. In this case, specifically, the first spline teeth 20 are formed on a face of the notch plate 4 being opposed to the ring gear 14 or to the flange 18 in such a manner to protrude parallel to the rotational center axis O, and the second spline teeth 22 is formed on a face of the flange 18 being opposed to the notch plate 4 in such a manner to be meshed with the first spline teeth 20. Each of the first spline tooth 20 and each of the second spline tooth 22 are individually shaped to have a triangle or trapezoidal cross-section, and each of the first flank 20a of the first spline teeth 20 and each of the second flanks 22a of the second spline teeth 22 are also individually set at a predetermined angle β.

According to the embodiment shown in FIG. 5, the notch plate 4 is also pushed away from the selector plate 3 by the thrust force Na when the notch plate 4 is rotated in the forward direction by a rotation of the ring gear 14. According to the embodiment shown in FIG. 5, therefore, the selector plate 4 may also be prevented from being rotated to be brought into engagement undesirably with the pocket plate 2 by the drag torque even if the notch plate 4 is rotated in the forward direction under a condition that the viscosity of the lubrication oil is high.

What is claimed is:

1. A selectable one-way clutch, comprising:
   a pocket plate that is fixed to a predetermined stationary member;
   a notch plate that is connected to a rotary member while being allowed to rotate relatively with the pocket plate opposed thereto;
   a selector plate that is interposed between the pocket plate and the notch plate while being allowed to rotate relatively with the pocket plate and the notch plate within a predetermined angle to selectively shift an operating mode of the selectable one-way clutch between an overrunning mode in which the notch plate is allowed to rotate relatively with the pocket plate in both directions without transmitting torque, and an engagement mode in which the notch plate is brought into engagement with the pocket plate to enable torque transmission in one direction;
   first spline teeth formed on a connecting portion of the notch plate connected to the rotary member;
   second spline teeth formed on the rotary member to be meshed with the first spline teeth to enable torque transmission between the notch plate and the rotary member;
   a first flank formed individually on the first spline teeth; and
   a second flank formed individually on the second spline teeth to be brought into contact to the first flank;
   wherein the first flank and the second flank are individually set at a predetermined angle with respect to a plane extending along a common rotational center axis of the notch plate and the rotary member to establish a component of torque of the rotary member rotating the notch plate in a same direction as a rotational direction of the selector plate to bring the selectable one-way clutch into the engagement mode, so as to isolate the notch plate away from the selector plate.

2. The selectable one-way clutch as claimed in claim 1, further comprising:
   a first cylinder formed in the notch plate in which the first spline teeth are formed on an inner circumferential face; and
   a second cylinder formed on the rotary member in which the second spline teeth are formed on an outer circumferential face to be meshed with the first spline teeth.

3. The selectable one-way clutch as claimed in claim 1, wherein the first spline teeth are formed on a face of the notch plate opposed to the rotary member in the axial direction, and
   wherein the second spline teeth are formed on a face of the rotary member opposed to the notch plate in the axial direction.

* * * * *